Figure 1:
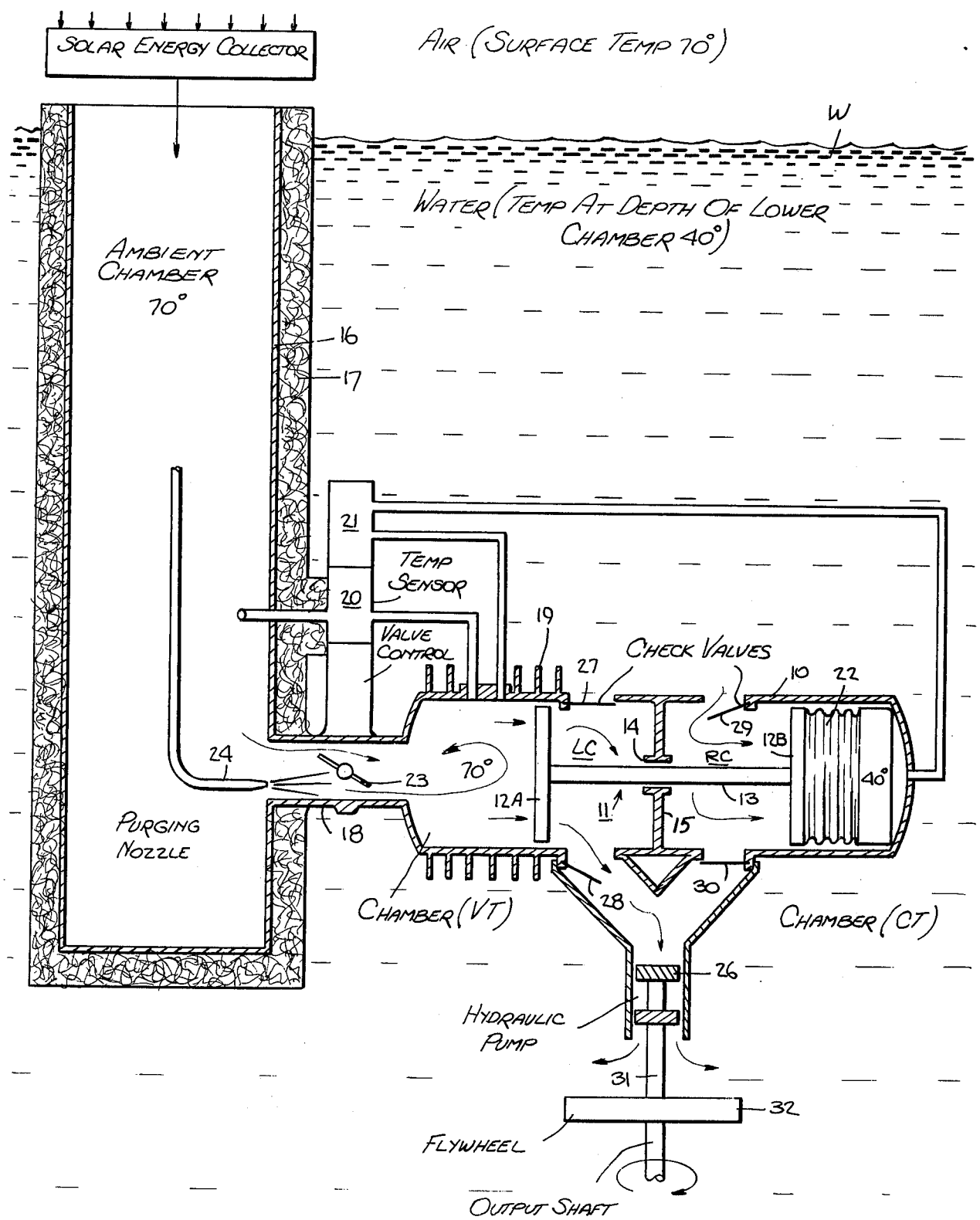

United States Patent [19]

Spector

[11] 4,041,707
[45] Aug. 16, 1977

[54] UNDERWATER THERMAL ENERGY CONVERSION UNIT

[76] Inventor: Donald Spector, 380 Mountain Road, Union City, N.J. 07087

[21] Appl. No.: 703,284

[22] Filed: July 7, 1976

[51] Int. Cl.$^2$ .............................................. F03G 7/04
[52] U.S. Cl. ..................................... 60/641; 60/398; 417/379
[58] Field of Search ................ 60/398, 325, 641, 650, 60/660, 682; 417/379

[56] References Cited

U.S. PATENT DOCUMENTS

| 3,805,515 | 4/1974 | Zener | 60/641 |
| 3,896,622 | 7/1975 | Daniello | 60/641 |
| 3,967,449 | 7/1976 | Beck | 60/398 X |

*Primary Examiner*—Allen M. Ostrager
*Assistant Examiner*—Stephen F. Husar

[57] ABSTRACT

An underwater thermal energy conversion unit adapted to exploit the temperature differential between the surface temperature and the water temperature at the depth of submersion to generate useful power. The unit includes a cylinder divided by a piston assembly into a variable-temperature (VT) air-filled chamber and a constant-temperature (CT) air-filled chamber, both chambers being in heat exchange relationship with the relatively cold water at the depth of the submerged cylinder. The air in the CT chamber is always at the cold water temperature, whereas the air in the VT chamber communicates through a thermally-insulated duct with ambient air above the water body, so that when a control valve is open, the air temperature within the VT chamber rises above the cold water temperature, and when the valve is thereafter closed to isolate the VT chamber from ambient air, the air temperature therein falls again to the cold water temperature. A sensing system causes the valve to open when the temperatures in both chambers are at about the same level. As a consequence, the temperature in the VT chamber proceeds to rise to create an air pressure difference between the chambers, causing the piston assembly to move in the direction of the CT chamber to compress the air therein. When the temperature in the VT chamber reaches a level close to that of the ambient air, the sensing system then acts to close the valve, and the temperature in the VT chamber then proceeds to fall. As this occurs, the pressurized air in the CT chamber forces the piston assembly in the direction of the VT chamber to a point of equilibrium to complete the cycle. The reciprocation of the piston assembly is converted into output power.

15 Claims, 3 Drawing Figures

PHASE I

PHASE II

UNDERWATER THERMAL ENERGY CONVERSION UNIT

BACKGROUND OF INVENTION

This invention relates generally to the extraction of useful power from the sea, and more particularly to an underwater thermal energy conversion unit that exploits the difference between the surface temperature of a water body and its temperature at the depth of submersion.

It has been estimated that in the course of a year the sun pours 3600 quintillion BTU's of energy upon the earth and that roughly half of the incredible amount of energy that reaches the earth lands in the tropics. Since the tropics are largely composed of ocean, most of the solar energy is soaked up and stored in the surface water of the sea.

The idea of extracting useful power from ocean thermal differences is almost 100 years old, having first been conceptualized in 1881 by the French physicist d'Arsonval. One possible technique to tap solar energy stored in the sea is by setting stored heat alongside stored cold, the latter being derived from water pumped up from the cooler depths.

One arrangement accomplishing this purpose is characterized in a recent *Business Week* article as "A Jules Verne Scheme to Harness Ocean Heat." This arrangement makes use of a floating platform on which a turbine is mounted, the turbine being spun by vaporized ammonia that is turned back to liquid in a condenser chilled by cold sea water pumped up to the platform from a depth of 4000 feet. The liquefied ammonia flows back to an evaporator tank to repeat the cycle.

Another approach is that taken in the 1935 U.S. Pat. No. 2,006,985 to Claude et al. Wherein the heat in the warm surface water of tropical seas is used to produce steam to drive a turbine. In the Claude et al. system, warm sea is pumped to an elevated tank which is maintained under sufficient vacuum by means of a barometric leg to cause the warm water to boil. The resultant low-pressure, low-density steam is passed to a power-generating turbine and then to a condenser in which the steam is liquefied by cold sea water pumped up from the depths of the sea. Thermal conversion techniques also involving the production of steam are also disclosed in the 1952 U.S. Pat. No. 2,595,164 to Nisolle and the 1976 U.S. Pat. No. 3,312,054 to Anderson.

The difficulty with schemes of the type heretofore proposed is that in all instances they involve relatively complex installations and require powered pumps or other mechanisms to bring a large volume of ocean-stored cold water alongside stored heat. And while many studies have been made regarding the possibilities of exploiting ocean thermal differences, and various projections have been made as to when in the distant future such installations will become a reality, the fact remains that there are no significant commercial installations based on existing schemes.

SUMMARY OF INVENTION

In view of the foregoing, the main object of this invention is to provide an underwater thermal energy conversion unit that exploits the temperature difference existing between the surface of a body of water and the depth at which the unit is submerged.

More particularly, it is an object of the invention in which by submerging the unit, the unit is directly subjected to the cold temperature of the water at the level at which it is submerged, the higher temperature of ambient air being made available to the unit through a duct extending between the unit at a point above the surface of the water.

Among the significant advantages of the invention are the following: The unit is of relatively simple, low-cost design, for no pumps or other mechanism are necessary to bring stored cold alongside stored heat, as in prior arrangements. Also, no use is made of propane, ammonia, or other hazardous gas; hence maintenance problems are minimized.

Also an object of the invention is to provide a unit in which the temperature differential between ambient air and cold ocean water is converted into a pressure difference serving to actuate a reciprocating engine.

Still another object of this invention is to provide an underwater thermal energy conversion unit that lends itself to economic construction in any desired scale in a range going from a small unit no larger than is needed to power a single household or to a large-scale unit adequate to supply power to a community. The unit may also be used to directly power off-shore installations such as off-shore oil rigs in which the unit may be installed in the submerged barge, above which is the platform of the rig.

Briefly stated, these objects are attained in a unit that includes a cylinder submerged in a body of water at a depth at which there is a marked temperature difference between the air temperature at the water surface and the water temperature at the level at which the unit is submerged.

The cylinder is divided by a reciprocating piston assembly into an air-filled variable temperature (VT) chamber and an air-filled constant temperature (CT) chamber, the relative volumes of the chambers depending on the axial position of the assembly within the cylinder. Both chambers are in heat exchange relationship with the relatively cold water at the depth at which the cylinder is submerged. The air in the CT chamber is always maintained at this cold water temperature, whereas the air in the VT chamber communicates through a thermally-insulated conduit with ambient air above the water body.

A control valve is interposed between the conduit and the VT chamber, and when this valve is open, the air temperature within the chamber rises above the cold water temperature, and when the valve is thereafter closed to isolate the VT chamber from ambient air, the air temperature therein returns to the cold water temperature.

A sensing system is provided which is arranged to cause the valve to open when the temperature in both chambers are substantially the same. As a result of the valve opening, the temperature in the VT chamber proceeds to rise to create an air pressure difference between the VT and the CT chamber, causing the piston assembly to move in the direction of the CT chamber to compress the air therein.

When the temperature in the VT chamber reaches a level close to that of the ambient air, the sensing system then acts to close the valve, as a result of which the air in the VT chamber which is now isolated from the conduit proceeds to fall. As this occurs, the compressed air in the CT chamber then forces the piston assembly in the direction of the VT chamber to a point of pressure equilibrium, thereby completing one working cycle.

The reciprocation of the piston assembly is converted into rotary power to drive a suitable generator.

OUTLINE OF DRAWING

Figure 2:
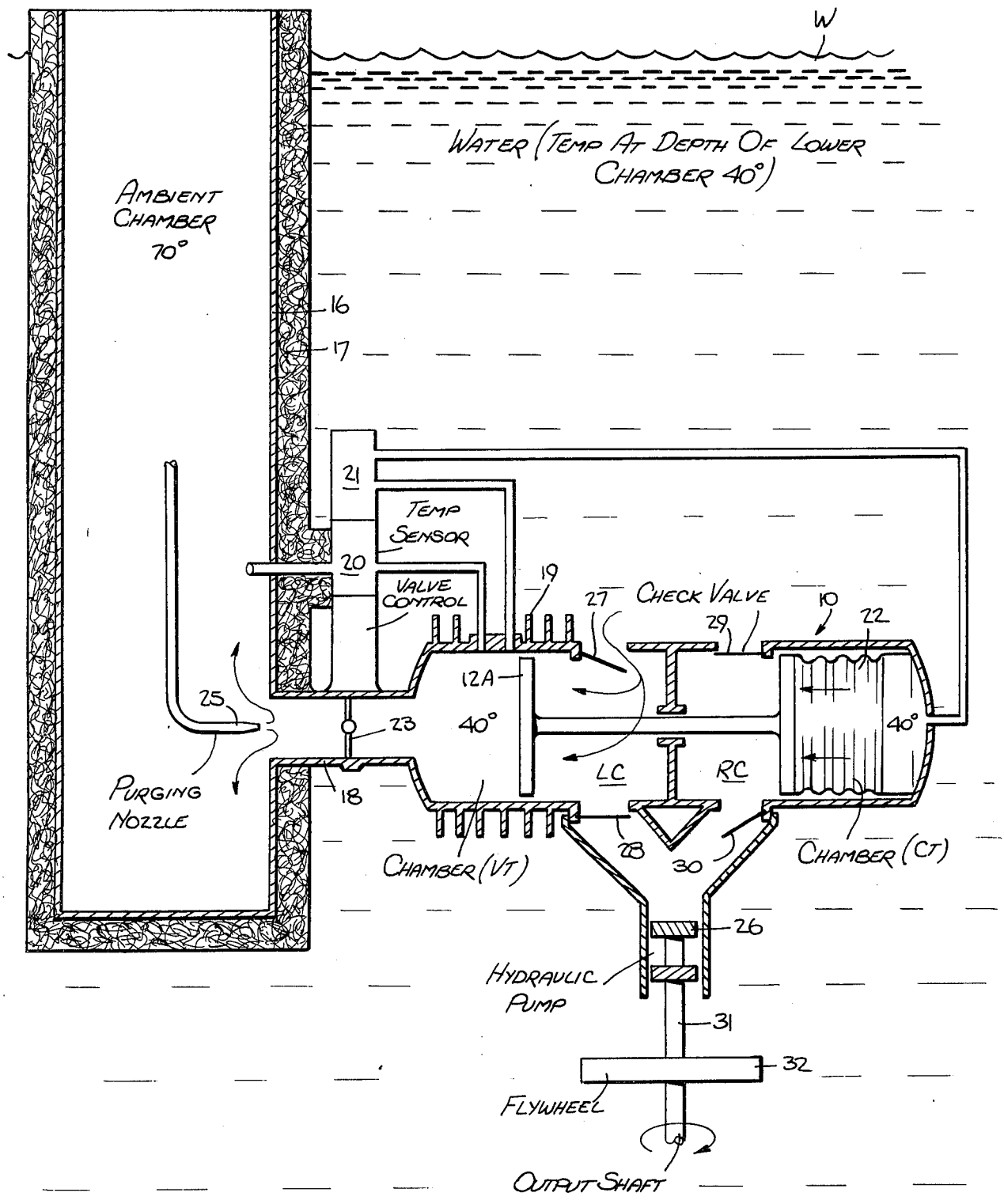
Figure 3:
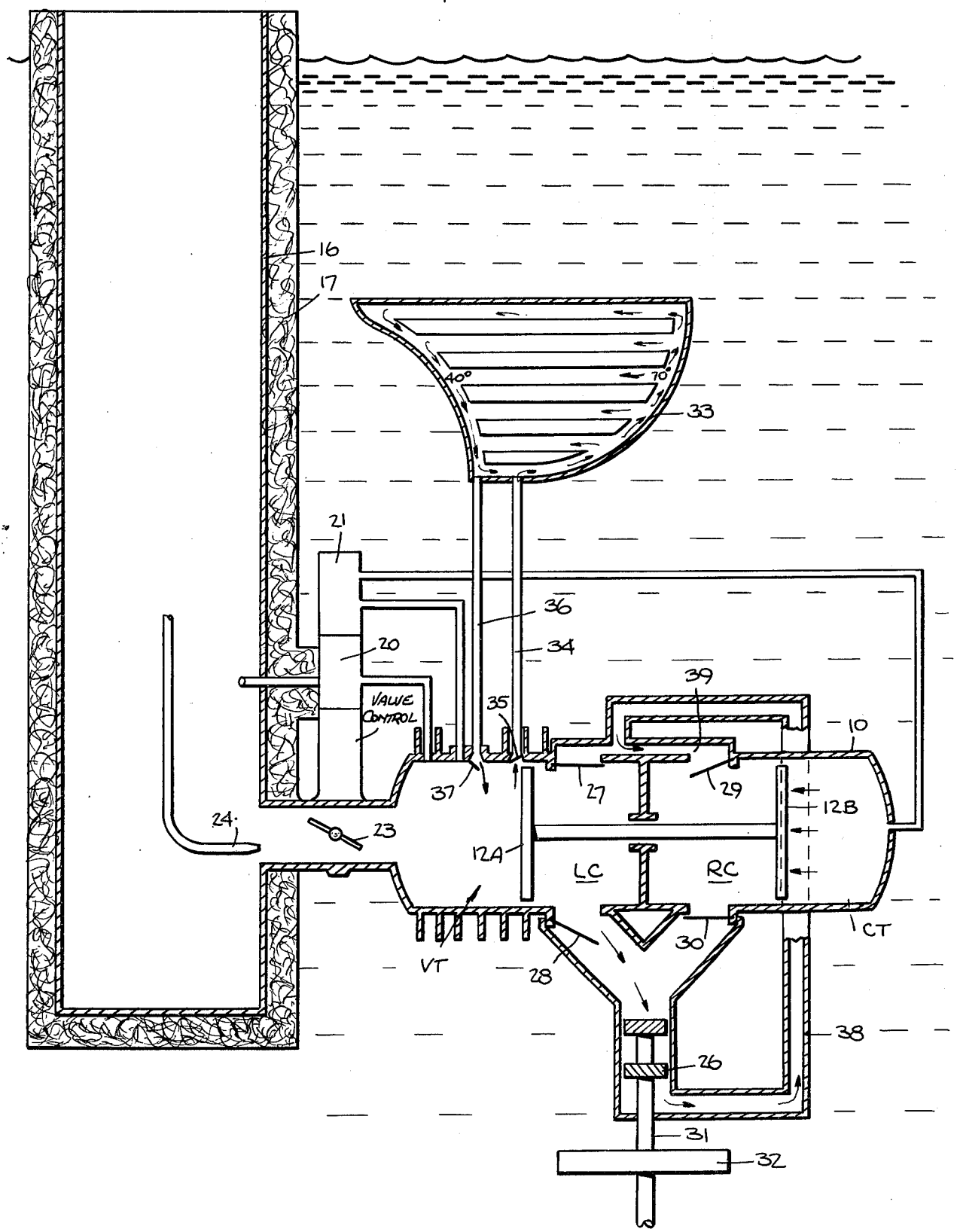

For a better understanding of the invention as well as other objects and further features thereof, reference is made to the following detailed description to be read in conjunction with the accompanying drawings, wherein:

FIG. 1 schematically shows a preferred embodiment of an underwater thermal energy conversion unit in accordance with the invention, the unit being shown in the first phase of its operating cycle;

FIG. 2 shows the same unit as that in FIG. 1 in the second phase of its operating cycle; and FIG. 3 illustrates a modification of the unit to accelerate the operating cycle and to effect the conversion of reciprocating to rotary motion.

DESCRIPTION OF INVENTION

The Basic Structure

Referring now to FIG. 1, there is shown a thermal energy conversion unit that includes a cylinder 10 formed of a metal or other material having high thermal conductivity. Cylinder 10 is divided by a piston assembly, generally designated by numeral 11 into an air-filled chamber VT of variable-temperature and an air-filled chamber CT of constant temperature. The relative volumes of these chambers depend on the axial position of the piston assembly in the cylinder.

Assembly 11 is constituted by a pair of spaced piston heads 12A and 12B joined together by a piston rod 13, the rod being axially movable through a thrust bearing 14 mounted at the center of a partition 15. Partition 15 is disposed at the midpoint of cylinder 10 and serves to divide the interior space between piston heads 12A and 12B into a left compartment LC and a right compartment RC. Air inside chamber CT is prevented from leaking out of the cylinder by means of a flexible gas bag 22 in an accordion formation secured to piston head 12B, this moving head serving to more or less compress the air in the bag.

Cylinder 10 is submerged in a body of water W at a depth at which the water surrounding the cylinder is at a temperature well below the temperature of the air at the surface of the water. By way of example, we shall assume that the air temperature is at 70° F, and the water temperature is at 40° F. Obviously, the actual differential depends on where the unit is installed. There are, of course, certain regions of the world where this differential is more pronounced than others, and the unit therefore has greater effectiveness as a thermal energy converter when placed in a tropical location where there is a marked difference between the surface and water temperature.

Associated with cylinder 10 is a vertical conduit 16 whose walls are provided with a layer 17 of thermal insulation. The conduit, which is open to air at its input end and closed at its output end, extends from a point above the surface water body W to an underwater point adjacent cylinder 10. The output end of conduit 16 communicates with the variable-temperature chamber VT of cylinder 10 through a lateral duct 18 having a control valve assembly 23 mounted thereon, whereby when the valve is open, this chamber is filled with air at the surface temperature of the air in the conduit, and when the valve is closed to isolate the chamber from the conduit, the temperature of the air in this chamber is then subjected to the cooling action of the cold water surrounding the cylinder. Also provided in the conduit is a nozzle 24 to purge the air in the VT chamber to speed up the change in chamber temperature resulting from the introduction of warm air.

To accelerate the cooling action, the wall of cylinder 10 which encircles chamber VT is provided with an array of radiating fins 19 which dissipate the chamber heat. Valve assembly 23 is controlled by means of two different temperature sensors 20 and 21 in a manner to be later described. Sensor 20 senses the difference in temperature between air in conduit 16 and that in variable-temperature chamber VT to produce a signal when these temperatures are at substantially the same level. Sensor 21 senses the difference in temperature between the air in variable-temperature chamber VT and constant-temperature chamber CT to produce a signal when these temperatures are at substantially the same level.

In practice, in order to expedite the interchange between ambient air temperature and water temperature and to heighten the temperature differential, the input end of the conduit may be associated with a solar energy system such as that disclosed in the 1975 U.S. Pat. to Parker, No. 3,919,998, wherein air is blown through a succession of collector stages having transparent windows, the energy extracted from the sun and collected by heat absorbers heating the air passing through the stages. Thus the temperature of the air forced down the conduit and entering the variable temperature chamber VT is much higher than the ambient temperature.

Operation

It is assumed for purposes of explanation that the temperature of the water surrounding cylinder 10 is at 40° F and that of the air in conduit 16 is 70° F. The temperature of the air in constant-temperature chamber CT, which is in thermal exchange with the water and is isolated from the conduit is always 40° F. The pressure of air in constant-temperature chamber CT depends on the position of piston head 12B, for the more this head moves toward the right to compress the air in bag 22, the greater the air pressure in chamber CT.

The air in variable-temperature chamber VT is also in heat exchange relationship with the cold water, but when valve 23 is open, as shown in FIG. 1, and warm air at 70° F from conduit 16 flows into this chamber, the air pressure in chamber VT is then at the atmospheric pressure of 15 psi, whereas the air in the CT chamber is at 40° F and initially at a pressure of 12 psi. As a consequence of this pressure differential, piston assembly 11 is forced to move toward the right, thereby compressing the air in the CT chamber until a pressure of 15 psi is attained, at which point the pressures are in equilibrium.

Valve 23 is then closed to isolate chamber VT from conduit 16, as a result of which the warm air in chamber VT proceeds to cool. With this cooling action, the air pressure which was 15 psi proceeds to drop until the air in this chamber is at 40° F (the water temperature) and at a pressure of 12 psi. When this occurs, there is now a pressure differential between the compressed air in chamber CT (15 psi) and the uncompressed air (12 psi) in chamber VT, as a consequence of which the piston assembly moves to the left until the pressures are again equallized.

The opening sequence in the course of which the piston assembly undergoes a forward stroke and a return stroke to complete a single operating cycle is controlled by valve assembly 23 in response to the signal from sensors 20 and 21.

Sensor 21 produces an output signal when the temperature in chamber CT, which is always 40° F (the prevailing water temperature), matches the temperature in chamber VT, which only occurs when valve 23 is closed and the warm air in chamber VT is cooled by the water until it attains the temperature of the water. When this signal is received, valve 23 is caused to open, as a result of which warm air diffusing into chamber VT causes the temperature therein to rise.

Sensor 20 produces an output signal when the air temperature in chamber VT matches the warm air temperature in conduit 16, when signal causes valve 23 to close. Thereafter, the air temperature in chamber VT proceeds to fall as a result of the cooling action of the surrounding water until it matches the air chamber in chamber CT. And when the air temperature in the two chambers again match, the resultant signal from sensor 21 causes valve 23 to open, thereby repeating the cycle.

The rapidity of the cycle therefore depends on the rate at which the air temperature in variable temperature chamber VT can be made to vary from a lower extreme, which is the temperature of the water at the depth of submersion, to an upper extreme, which is the ambient temperature of the surface air.

Conversion

In the embodiment of the unit desclosed in FIGS. 1 and 2, the temperature differential between air and water is converted into reciprocating motion. In order to transform this motion into rotary motion for driving an electrical generator or for any other purpose, a hydraulic turbine 26 is provided which is operatively coupled to the compartments LC and RC formed between heads 12A and 12B. Compartment LC is provided with inlet and outlet check valves 27 and 28, while compartment RC is provided with inlet and outlet check valves 29 and 30. These valves are actuated by the movement of piston assembly 11 so that in both the forward and reverse strokes, water is forced by moving piston heads 12A and 12B into turbine 26 to cause rotation thereof. This rotation is transmitted to an output shaft 31 having a flywheel 32 thereon to maintain rotation at a constant rate.

When the piston assembly moves toward the right, as shown in FIG. 1, valve 27 is closed and valve 28 is open in compartment LC, causing water previously admitted into this compartment to be forced into the turbine by piston head 12A, as the volume of this compartment is continuously reduced. While this is going on, valve 29 in compartment RC is open to admit water therein, and valve 30 is closed to prevent discharge of water from this compartment.

When the piston assembly moves toward the left, as shown in FIG. 2, water is admitted into compartment LC, while water previously admitted into compartment RC is discharged into the turbine; for in this phase inlet valve 29 of compartment RC is closed and outlet valve 30 is open. Thus the reciprocating motion of the piston assembly is converted into unidirectional rotary movement of the turbine which is maintained at a constant rate by flywheel 32 to provide a motive power source which may be used to drive a generator or for any other purpose.

Second Embodiment

The submerged underwater energy conversion unit illustrated in FIG. 3 operates along the same lines as the unit shown in FIGS. 1 and 2 but at a more rapid rate, in that the temperature transition within the variable-temperature chamber VT takes place more quickly.

This is effected by means of a heat exchange register 33 operatively coupled to variable-temperature chamber VT through an inlet pipe 34 having a check valve 35 therein and an output pipe 36 having a check valve 37 therein. In this register, the air flowing through its manifold pipes interact thermally with the cold water surrounding the register. Thus warm air at 70° F admitted into chamber VT at a pressure of about 15 psi creates a pressure differential with the air in constant temperature chamber CT wherein the air is always at 40° F and is initially at a pressure of 12 psi. This pressure differential results in movement of the piston assembly toward the left, thereby compressing the cold air in the CT chamber until the pressure therein is about 15 psi and produces a back pressure matching that of the air pressure in chamber VT, at which point the pressures are in equilibrium and no further piston movement occurs.

Meanwhile the warm air in chamber VT is passing through open check valve 35 into heat exchanger 33 in which the air at a temperature of 70° F and a pressure of 15 psi is rapidly changed to a temperature of 40° F and a pressure of 12 psi, the cold air being admitted to chamber VT through valve 37. Now a pressure difference arises between the cold compressed air in the CT chamber whose pressure is at 15 psi, and the cold uncompressed air in the VT chamber whose pressure is at 12 psi, as a result of which the piston assembly is caused to shift to the right until the pressure equilibrium is restored. It will be appreciated, therefore, that the faster the transition in the VT chamber from hot to cold, the more rapid the rate of piston reciprocation. Also to be recognized is that the larger the differences in the surface air temperature and the water depth temperature, the greater the power generated.

In the unit desclosed in FIGS. 1 and 2, the turbine is driven by ocean water which is forced into the turbine by the reciprocating piston assembly, check valves 27 and 30 cooperating with compartments LC and RC so that the water flow through the turbine is always in the same direction.

The unit in FIG. 3 makes use of a closed hydraulic fluid system rather than an open ocean water arrangement. To this end, the output of turbine 26, instead of being discharged into the open water, is fed through a feedback pipe 38 into an inlet chamber 39 which supplies hydraulic fluid into the left compartment LC when check valve 27 is open and into the right compartment RC when check valve 29 is open. The advantage of a closed hydraulic system is that it is isolated from turbulent currents that may arise in an open system.

Because the air in heat exchanger 33 is exposed to the cold water, a pressure difference exists between this air and the relatively warm air in the VT chamber. As a result of this difference, air from chamber VT is sucked into the exchanger, thereby accelerating the transfer of air from the chamber into the exchanger. The VT chamber in this embodiment need not be of high thermal conductivity, for the necessary heat exchange between the air and water takes place largely in the heat exchanger.

An important advantage of the present invention over thermal energy converters of the type heretofore known, wherein water drawn from the depths is circulated in the converter, is that in the present unit only air drawn from the surface is internally circulated. Because the air is substantially free of impurities the unit can be maintained in service indefinitely without the need to remove impurities clogging the system. But in a water-circulating unit, algae is present and barnacles form on the interior walls of the circulating system, making it necessary to service the unit periodically.

In practice, rather than submerge the unit in water, which, because of the buoyancy of the unit, dictates an anchor, the unit may be installed in an underwater tunnel in the ocean bed, with only the heat exchanger disposed outside of the tunnel in thermal contact with the water.

While there have been shown and described preferred embodiments of an underwater thermal energy conversion unit in accordance with the invention, it will be appreciated that many changes and modifications may be made therein without, however, departing from the essential spirit thereof.

I claim:

1. An underwater thermal energy conversion unit comprising:
  A. a cylinder submergible in a body of water at a depth at which a marked temperature difference is encountered between ambient air temperature at the surface and water temperature;
  B. a reciprocating piston assembly disposed in said cylinder and dividing the cylinder into an air-filled variable temperature first chamber and an air-filled constant temperature second chamber, both chambers being in heat exchange relationship with the cold water at the depth of submersion;
  C. a duct communicating with said first chamber and extending to the surface whereby said first chamber is fillable with air at ambient temperature, the temperature of air in the second chamber always being that of the surrounding water;
  D. a control valve interposed between said duct and said first chamber, whereby when the valve is open, the air temperature in said first chamber rises above the temperature of the water, and when the valve is closed, it falls to the temperature of the water at a rate determined by the heat exchange relationship between said first chamber and the surrounding water; and
  E. means responsive to the temperature difference between the air in said first chamber and the air in said duct and to the temperature difference between the air in said first and second chambers to produce control signals for operating said valve, whereby when the air temperature in both chambers are at about the same level, the valve is caused to open to admit warm air therein, as a consequence of which the temperature in the first chamber rises to create a pressure difference causing the piston assembly to move in the direction of the second chamber and to compress the air therein until a point of pressure equilibrium is reached, and when the temperature in the first chamber reaches a temperature level close to that of the ambient air, the valve closes and the air temperature in the first chamber then proceeds to fall, in the course of which the compressed air in the second chamber forces the cylinder assembly in the direction of the first chamber until a point of pressure equilibrium is reached.

2. A unit as set forth in claim 1, wherein said assembly includes a pair of piston heads, one head constituting the end wall of the first chamber, and the other head the end wall of the second chamber.

3. A unit as set forth in claim 1, further including underwater means to convert the reciprocating motion of the assembly into rotary motion.

4. A unit as set forth in claim 1, wherein said duct is provided with thermal insulation.

5. A unit as set forth in claim 1, wherein said means responsive to the temperature differences includes a first sensor to detect the difference between the air temperature in the duct and that in the first chamber to produce an output signal, and a second sensor to detect the air temperature difference between the two chambers to produce an output signal, the output signals of the sensors being applied to a valve control mechanism.

6. A unit as set forth in claim 2, wherein the air in the second chamber is confined within a bellows secured to one of said piston heads.

7. A unit as set forth in claim 2, wherein said heads are interconnected by a rod which passes through a thrust-bearing in a partition which divides the cylinder in half to define a left compartment between one head and the partition and a right compartment between the other head and the partition.

8. A unit as set forth in claim 7, wherein said compartments are operatively coupled to a hydraulic pump, valve means being provided to alternately pass fluid from said compartments into said pump as said assembly reciprocates.

9. A unit as set forth in claim 8, wherein said valve means is constituted by an inlet and outlet check valve in each compartment.

10. A unit as set forth in claim 9, wherein said compartments are filled with a hydraulic fluid in a recirculating closed system in which the output of said hydraulic pump is fed alternately to said compartments through the inlet check valves thereof.

11. A unit as set forth in claim 1, wherein said first chamber is provided with radiating fins.

12. A unit as set forth in claim 1, further including a heat-exchanger coupled by inlet and outlet pipes to said first chamber to accelerate the transition in said chamber from the ambient air temperature to the temperature of the water.

13. A unit as set forth in claim 1, further including a solar energy collector at the input of the duct to raise the temperature of the air fed into the first chamber.

14. A unit as set forth in claim 8, further including a generator operated by said hydraulic pump.

15. A unit as set forth in claim 1, further including a nozzle disposed in said duct at the entry to said first chamber to purge the air therein.

* * * * *

UNITED STATES PATENT OFFICE
CERTIFICATE OF CORRECTION

Patent No. 4,041,707　　　　　　　　　Dated August 16, 1977

Inventor(s) Donald Spector

It is certified that error appears in the above-identified patent and that said Letters Patent are hereby corrected as shown below:

Column 1, line 35 "Wherein" should have read -- wherein --

Column 5, line 30 "desclosed" should have read -- disclosed --

Column 5, line 14 "when" should have read -- which --

Column 6, line 46 "and" first occurrence should have read -- to--

*Signed and Sealed this*

*Thirteenth* Day of *December 1977*

[SEAL]

*Attest:*

RUTH C. MASON　　　　　LUTRELLE F. PARKER
*Attesting Officer*　　　*Acting Commissioner of Patents and Trademarks*